E. Wilkinson, Jr.
Soldering Clamp.

Nº 57,237.      Patented Aug. 14, 1866.

Witnesses:

Inventor:
E. Wilkinson Jr.
Per Munn & Co
Attorneys

UNITED STATES PATENT OFFICE.

E. WILKINSON, JR., OF MANSFIELD, OHIO.

IMPROVEMENT IN DEVICES FOR HOLDING EAVE-TROUGHS WHILE SOLDERING THEM.

Specification forming part of Letters Patent No. 57,237, dated August 14, 1866.

*To all whom it may concern:*

Be it known that I, E. WILKINSON, Jr., of Mansfield, in the county of Richland and State of Ohio, have invented new and useful Improvements in Soldering Eave-Troughs; and I do hereby declare that the following is a full, clear, and exact description thereof, which will enable those skilled in the art to make and use the same, reference being had to the accompanying drawings, forming part of this specification.

The present invention relates to a new and improved holder for eave-troughs while being soldered, whereby the work can be accomplished with much greater facility and much more evenly and better than by the old method heretofore practiced, as will be obvious from the following detail description thereof, reference being had to the accompanying plate of drawings, of which—

Figure 3:
Figure 1:
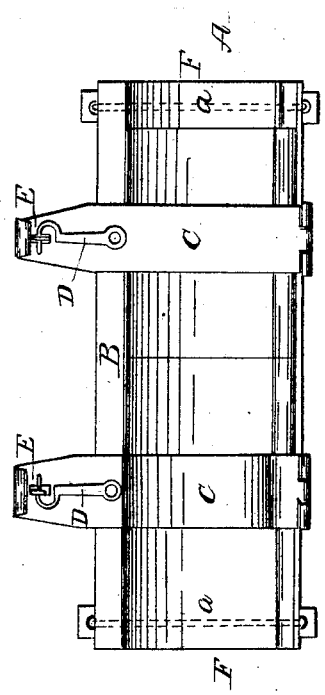
Figure 2:
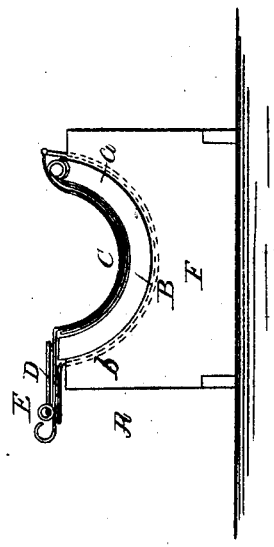

Figure 1 is a plan or top view; Fig. 2, a transverse vertical section taken in the plane of the line $x\,x$, Fig. 1; and Fig. 3, a detail view, to be hereinafter referred to.

A in the drawings represents the holder for the eave-trough while being soldered, which consists of a hollow concave bed, B, corresponding in transverse section to the shape of the trough in which it is placed, with the two ends of its sections which are to be soldered together overlapping each other, in which position they are firmly held by clamps C C, hinged to one side of the bed B, and of suitable shape that when swung down to and upon the eave-trough they will firmly bind the same around and in the concave bed B, these clamps being secured by interlocking their hooks D in the fixed staples E of the concave bed B, or in any other suitable manner. The concave bed is supported at each end upon end pieces, F, suitably cut out therefor, and each having a circular-shaped groove cut in the same, in which fits a corresponding shaped rib or flange, $b$, upon the under side of the concave bed, whereby the trough-holder can be turned sufficiently to enable the solder to flow freely and level itself upon the joint of the trough.

From the above description it is plain to be seen that the soldering of the eave-trough can be accomplished with the utmost facility and in a much better manner than the ordinary mode heretofore practiced, and, furthermore, rendered much stronger and more durable, the importance of all of which is obvious.

The clamps C may be connected together, if desired, in such manner as to be all opened and closed together and at one and the same time.

I claim as new and desire to secure by Letters Patent—

The frame F and flanges $b$, in combination with the concave bed B, having clamps C C, all constructed and arranged together substantially as and for the purpose specified.

E. WILKINSON, JR.

Witnesses:
JOHN McMANN,
A. SLUTZ.